United States Patent
Hook et al.

(10) Patent No.: US 9,605,350 B2
(45) Date of Patent: Mar. 28, 2017

(54) PROCESS AND APPARATUS FOR PURIFICATION OF INDUSTRIAL BRINE

(71) Applicant: Blue Cube IP LLC, Midland, MI (US)

(72) Inventors: Bruce Hook, Lake Jackson, TX (US); Dan Tirtowidjojo, Lake Jackson, TX (US); Anil Mehta, Lake Jackson, TX (US)

(73) Assignee: BLUE CUBE IP LLC, Midland, MI (US)

( * ) Notice: Subject to any disclaimer, the term of this patent is extended or adjusted under 35 U.S.C. 154(b) by 585 days.

(21) Appl. No.: 13/922,658

(22) Filed: Jun. 20, 2013

(65) Prior Publication Data
US 2013/0281721 A1   Oct. 24, 2013

Related U.S. Application Data

(62) Division of application No. 12/671,176, filed as application No. PCT/US2008/073448 on Aug. 18, 2008, now Pat. No. 8,501,034.

(60) Provisional application No. 60/957,671, filed on Aug. 23, 2007.

(51) Int. Cl.
| | | |
|---|---|---|
| B01D 1/00 | (2006.01) |
| B01D 11/04 | (2006.01) |
| C25B 1/16 | (2006.01) |
| B01D 9/00 | (2006.01) |
| C01D 3/14 | (2006.01) |
| B01J 19/00 | (2006.01) |
| C01D 3/16 | (2006.01) |
| C25B 1/26 | (2006.01) |

(52) U.S. Cl.
CPC .............. *C25B 1/16* (2013.01); *B01D 9/0031* (2013.01); *B01J 19/00* (2013.01); *C01D 3/14* (2013.01); *C01D 3/16* (2013.01); *C25B 1/26* (2013.01)

(58) Field of Classification Search
CPC .......... C02F 9/00; C02F 1/048; C02F 1/5236; B01D 9/0018
USPC .......................... 422/256, 260–261, 285, 308
See application file for complete search history.

(56) References Cited

U.S. PATENT DOCUMENTS

| | | |
|---|---|---|
| 4,240,885 A | 12/1980 | Suciu et al. |
| 6,340,736 B1 | 1/2002 | Coenen et al. |
| 2007/0189945 A1* | 8/2007 | Kopp ...................... C01D 3/06 423/158 |

FOREIGN PATENT DOCUMENTS

| | | |
|---|---|---|
| EP | 1687248 | 11/2004 |
| EP | 1762556 | 5/2005 |
| WO | 2005005147 | 1/2005 |
| WO | 2005054167 | 6/2005 |
| WO | 2006020234 | 2/2006 |
| WO | 2006100318 | 9/2006 |

\* cited by examiner

*Primary Examiner* — Monzer R Chorbaji
(74) *Attorney, Agent, or Firm* — Polsinelli PC (57) ABSTRACT

Processes and apparatus for purifying brine are provided including (1) providing an aqueous brine solution comprising one or more inorganic salts and one or more organic compounds and (2) conducting at least one unit operation for removing organic compounds from the brine solution to obtain a purified brine solution.

12 Claims, 2 Drawing Sheets

PROCESS AND APPARATUS FOR PURIFICATION OF INDUSTRIAL BRINE

CROSS-REFERENCE TO RELATED APPLICATIONS

The present application is related to the following applications, filed on even date herewith, with the disclosures of each the applications being incorporated by reference herein in their entireties:

Application Ser. No. 12/670,020, now U.S. Pat. No. 8,343,328, filed on Jan. 21, 2010, entitled "Brine Purification".

Application Ser. No. 12/670,142, filed on Jan. 22, 2010, entitled "Total Organic Carbon (TOC) Reduction in Brine Via Chlorinolysis".

Application Ser. No. 12/671,372, filed on Jan. 29, 2010, entitled "Process, Adapted Microbes, Composition and Apparatus for Purification of Industrial Brine".

Application Ser. No. 12/670,686, filed on Jan. 26, 2010, entitled "Brine Purification".

BACKGROUND OF THE INVENTION

The present invention relates to processes and apparatus for purification of brine generated by industrial processes. Purified brine may be used in industrial processes such as the chlor-alkali process for electrolytic conversion of brine to chlorine gas or hypochlorite and sodium hydroxide.

Brine is generated by industrial processes that react chlorine atom-containing compounds with an inorganic base such as sodium hydroxide to form an aqueous brine solution containing chloride salts. Examples include the production of epichlorohydrin by reacting chlorohydrins with sodium hydroxide, the production of epoxy resins by reacting epichlorohydrin with polyphenolic compounds, such as bisphenol A or bisphenol F, in which the base reacts with chlorine atoms of the epichlorohydrin and the phenolic hydrogen atoms, and scrubbing of industrial effluent to remove hydrogen chloride from a chemical stream by reacting the hydrogen chloride with sodium hydroxide, such as in the hydrogen chloride absorber used to remove hydrogen chloride during the phosgenation process used to make isocyanates. The aqueous brine solutions produced by such processes often contain one or more organic compounds associated with the process(es) from which the brine is derived.

Aqueous brine solutions containing sodium chloride as the predominant salt are useful for the production of chlorine gas or hypochlorite and sodium hydroxide by an electrolytic process known as the chlor-alkali process. Chlorine gas, hypochlorite and sodium hydroxide produced by the chlor-alkali process are useful in a number of industrial processes in which chlorine atoms and/or a strong base is required. It would be desirable to be able to use aqueous brine solutions produced by industrial processes in the chlor-alkali process to integrate industrial chemical processes and thereby reduce raw material acquisition and byproduct disposal costs.

A problem associated with using aqueous brine solutions produced by industrial processes in the chlor-alkali process is that the presence of impurities such as organic compounds in such aqueous brine solutions must generally be reduced to a very low concentration, because the chlor-alkali process has a low tolerance for impurities, including organic compounds. Generally, the organic compound concentration in aqueous brine used in industrial chlor-alkali production should be less than 50 ppm, and preferably should be less than 10 ppm, total organic carbon (TOC).

A known method for reducing the organic compound concentration in aqueous brine solutions is to conduct ozonolysis to oxidize organic compounds to more volatile oxidation fragments and/or carbon dioxide that can be stripped from the aqueous brine solution. Ozonolysis is generally carried out by introducing ozone gas or ozone dissolved in water into the aqueous brine solution at an elevated temperature. Such a process is disclosed, for example, in U.S. Pat. No. 6,340,736.

Another known method for reducing the organic compound concentration in aqueous brine solutions is to conduct chlorinolysis to oxidize organic compounds to more volatile oxidation fragments and/or carbon dioxide that can be stripped from the aqueous brine solution. Chlorinolysis is generally carried out by introducing chlorine gas or hypochlorite into the aqueous brine solution at an elevated temperature. Such a process is disclosed, for example, in U.S. Pat. No. 4,240,885.

A disadvantage of relying solely on chlorinolysis for removal of organic compounds is that substantial amounts of chlorine gas or hypochlorite is generally required to reduce the organic compound concentration to an acceptable level when the initial organic compound concentration prior to chlorinolysis is relatively high. In that case, the purification process consumes a substantial portion of the chlorine gas or hypochlorite generated by the chlor-alkali process to thereby reduce the availability of the chlorine gas or hypochlorite generated by the chlor-alkali process for other industrial processes.

Another disadvantage of relying solely on chlorinolysis is that compounds containing oxygen atoms such as alcohols, acids, esters, aldehydes, ketones, and ethers are generally more difficult to oxidize to break them down into oxidation fragments sufficiently volatile to be stripped from the aqueous brine solution. Reducing the concentration of such oxygen-containing compounds to an acceptable level via chlorinolysis is difficult and expensive.

Another disadvantage of relying solely on chlorinolysis is that it requires treatment of the vapor stream stripped from the brine solution to prevent discharge of chorine gas, hypochlorite and any chlorinated hydrocarbons into the environment.

Opportunities therefore remain to further improve the purification of aqueous brine solutions containing organic compounds so that the brine can be used for chlor-alkali electrolysis.

SUMMARY OF THE INVENTION

One aspect of the present invention is a process for purifying brine comprising:

(1) providing an aqueous brine solution comprising one or more inorganic salts and one or more organic compounds; and (2) conducting at least one unit operation for removing organic compounds from the brine solution to obtain a purified brine solution;

wherein at least about 80 weight-percent of the one or more inorganic salts of the aqueous brine solution provided in step (1) is sodium chloride and the at least one unit operation comprises a first redis solution operation comprising:

(a) crystallizing sodium chloride in the aqueous brine solution to form sodium chloride crystals and a first mother liquor, (b) separating the sodium chloride crystals from the first mother liquor, and (c) redissolving the separated sodium chloride crystals in an aqueous solution having an organic compound concentration substantially less than the organic compound concentration in the aqueous brine solution provided in step (1) to obtain a first purified brine solution.

Another aspect of the present invention is an apparatus for purifying brine comprising:

(1a) at least, a first forced circulation evaporative crystallizer; hereafter such process is referred to as one-stage evaporative crystallization process;

(1b) if necessary, a second forced circulation evaporative crystallizer; hereafter such process is referred to as two-stage evaporative crystallization process;

(2a) at least, a first separation device for separating solids from liquids in one-stage evaporative crystallization process;

(2b) if necessary, a second separation device for separating solids from liquids in two-stage evaporative crystallization process;

(3a) a first dilution vessel; and (3b) a second dilution vessel,

Wherein in the case of one-stage evaporative crystallizer, the at least first forced circulation evaporative crystallizer is connected to the at least first separation device for conducting a slurry stream comprising an aqueous liquid and crystals from the at least first forced circulation evaporative crystallizer to the at least first separation device;

the at least first separation device is connected to the at least first dilution vessel for conducting crystals from the at least first separation device to the first dilution vessel;

the first dilution vessel is connected to a source of aqueous liquid for redissolving crystals received from the first separation device;

in the case of two-stage evaporative crystallizer, the first dilution vessel is connected to the second forced circulation evaporative crystallizer for conducting a brine comprising redissolved crystals from the first dilution vessel to the second forced circulation evaporative crystallizer;

the second forced circulation evaporative crystallizer is connected to the second separation vessel for conducting a slurry stream comprising an aqueous liquid and crystals from the second forced circulation evaporative crystallizer to the second separation device;

the second separation device is connected to the second dilution vessel for conducting crystals from the second separation device to the second dilution vessel;

the second dilution vessel is connected to a source of aqueous liquid for redissolving crystals received from the second separation device; and the second dilution vessel is connected to the first separation device for conducting a brine comprising redissolved crystals from the second dilution vessel to the first separation device for washing the crystals separated by the first separation device.

Yet another aspect of the present invention is a chemical process apparatus for producing purified brine comprising a chemical reaction apparatus suitable for reacting a chlorine-atom containing compound with sodium hydroxide to make an aqueous brine solution and a brine purification apparatus according to the present invention, wherein the chemical reaction apparatus is connected to the brine purification apparatus for conducting an aqueous brine solution from the chemical reaction apparatus to the brine purification apparatus and the chemical reaction apparatus is connected to a source of aqueous sodium hydroxide solution for conducting the aqueous sodium hydroxide solution to the chemical reaction apparatus.

In all aspects of the invention, the brine may be optionally used in a chlor-alkali plant to produce sodium hydroxide solution, including, perhaps, the source of sodium hydroxide used to produce the brine itself.

BRIEF DESCRIPTION OF THE DRAWINGS

For the purpose of illustrating the present invention, the drawings show forms of the present invention which are presently preferred. However, it should be understood that the present invention is not limited to the precise arrangements and instrumentation shown in the drawings. In the accompanying drawings, like reference numerals are used to denote like parts throughout the drawings.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

DEFINITIONS

As used herein, the expression "total organic carbon" (abbreviated hereafter as "TOC") refers to the concentration of organic compounds in a given composition expressed in terms of the total weight of carbon atoms present in the organic compound molecules present in that composition. In other words, TOC excludes the contribution of atoms in organic molecules other than carbon to the total weight of the organic molecules when calculating the concentration of the organic compounds in terms of weight-percent or parts-per-million (ppm). TOC also excludes carbon atoms that are not present in organic compounds, such as the carbon atoms present in carbon dioxide.

As used herein, the term "multihydroxylated-aliphatic hydrocarbon compound" (abbreviated hereafter as "MAHC") refers to a compound that contains at least two hydroxyl groups covalently bonded to two separate vicinal carbon atoms and no ether linking groups. They contain at least two sp3 hybridized carbons each bearing an OH group. The MAHCs include any vicinal-diol (e.g. 1,2-diol) or triol (e.g. 1,2,3-triol) containing hydrocarbon including higher orders of contiguous or vicinal repeat units. The definition of MAHC also includes for example one or more 1,3- 1,4-, 1,5- and 1,6-diol functional groups as well. Geminal-diols, for example, are precluded from this class of MAHCs.

The MAHCs contain at least 2, preferably at least 3, up to about 60, preferably up to 20, more preferably up to 10, even more preferably up to 4, and yet more preferably up to 3, carbon atoms and can contain, in addition to aliphatic hydrocarbon, aromatic moieties or heteroatoms including for example halide, sulfur, phosphorus, nitrogen, oxygen, silicon, and boron heteroatoms; and mixtures thereof. The MAHCs may also be a polymer such as polyvinyl alcohol.

The terms "glycerin", "glycerol" and "glycerine", and esters thereof, may be used as synonyms for the compound 1,2,3-trihydroxypropane, and esters thereof.

As used herein, the term "chlorohydrin" means a compound containing at least one hydroxyl group and at least one chlorine atom covalently bonded to two separate vicinal aliphatic carbon atoms and no ether linking groups. Chlorohydrins are obtainable by replacing one or more hydroxyl groups of MAHCs with covalently bonded chlorine atoms via hydrochlorination. The chlorohydrins contain at least 2, and preferably at least 3, up to about 60, preferably up to 20, more preferably up to 10, even more preferably up to 4, and yet more preferably up to 3, carbon atoms and, in addition to aliphatic hydrocarbon, can contain aromatic moieties or heteroatoms including for example halide, sulfur, phosphorus, nitrogen, oxygen, silicon, and boron heteroatoms, and mixtures thereof. A chlorohydrin that contains at least two hydroxyl groups is also a MAHC.

The term "epoxide" means a compound containing at least one oxygen bridge on a carbon-carbon bond. Generally, the carbon atoms of the carbon-carbon bond are contiguous and the compound can include other atoms than carbon and oxygen atoms, like hydrogen and halogens, for example. Preferred epoxides are ethylene oxide, propylene oxide, glycidol and epichlorohydrin, or their derivatives.

The term "TAFFY process" refers to a popular industrial process for preparing higher molecular weight epoxy polymers where bisphenol-A and epichlorohydrin are reacted in presence of sodium hydroxide.

The term "LER" stands for liquid epoxy resin and refers to a lower molecular weight epoxy resin, including its oligomers, formed from the reaction of bisphenol A, epichlorohydrin and sodium hydroxide with sodium chloride as a reaction by-product.

As used herein, the term "hetero atom" refers to an atom of the Periodic Table of Elements other than a carbon atom or a hydrogen atom.

As used herein, the expression, "liquid phase" refers to a continuous intermediate phase between gas phase and a solid phase that may optionally comprise a minor amount of gas and/or solid discrete phase(s). The liquid phase may comprise one or more immiscible liquid phases and may contain one or more dissolved solids, such as one or more acids, bases, or salts.

As used herein, the expression "vapor phase" refers to a continuous gaseous phase that may optionally comprise a minor amount of liquid and/or solid discrete phase(s) (e.g., aerosol). The vapor phase may be a single gas or a mixture, such as a mixture of two or more gases, two or more liquid discrete phases, and/or two or more solid discrete phases.

As used herein, the expression "liquid-vapor contacting device" refers to devices that serve to provide the contacting and development of at least one interfacial surface between liquid and vapor in the device. Examples of liquid-vapor contacting devices include plate column, packed column, wetted-wall (falling film) column, spray chamber, heat exchanger or any combination thereof. Examples of devices comprising plate columns and packed columns include distillation columns, fractionation columns, and stripping columns Aqueous Brine Solution The aqueous brine solution treated according to the present invention comprises one or more inorganic salts and one or more organic compounds.

The aqueous brine solution preferably comprises at least 10, more preferably at least 14, more preferably at least 17, up to saturation, more preferably up to 23, weight-percent inorganic salt(s).

The one or more inorganic salts within the brine solution comprise at least 80, preferably at least 90, more preferably at least 95, even more preferably at least 99, yet more preferably at least 99.9, and yet even more preferably at least 99.99, weight-percent sodium chloride.

In another preferred embodiment, the aqueous brine solution preferably comprises at least 10, more preferably at least 14, more preferably at least 17, up to saturation, more preferably up to 23, weight-percent sodium chloride.

The aqueous brine solution preferably contains less than 100, more preferably less than 10, and even more preferably less than 1, ppm of each inorganic salt comprising a cation other than an element belonging to Group I of the Periodic Table of Elements (i.e., the alkali metals). Examples of such cations include elements belonging to Group II of the Periodic Table of Elements such as Ca, Mg, Sr, and Ba, transition elements such as Cr, Mn, Fe, Ni, Cu, Zn, and Mo, other elements such as Al and Si, and $NH_4+$. The total amount of inorganic salt comprising a cation other than an element belonging to Group I of the Periodic Table of Elements in the aqueous brine solution is preferably less than 100, more preferably less than 10, and even more preferably less than 1, ppm.

The aqueous brine solution preferably contains less than 100, more preferably less than 10, and even more preferably less than 1, ppm of each inorganic salt comprising an anion other than $Cl^-$. Examples of such anions include $CO_3^-$, $SO_4^{2-}$, $NO_3^-$, and $ClO_4^{2-}$. The total amount of inorganic salt in the aqueous brine solution comprising anions other than $Cl^-$ is preferably less than 100, more preferably less than 10, even more preferably less than 5, and yet more preferably less than 1, ppm.

The one or more organic compounds in the aqueous brine may be selected from any known organic compounds. The organic compounds are preferably compounds that contain moieties amenable to forming volatile oxidation fragments and/or carbon dioxide via biological oxidation. The organic compounds are preferably hydrocarbon compounds comprising one or more, preferably multiple, carbon atoms, one or more, preferably multiple, hydrogen atoms, and optionally one or more, preferably multiple, hetero atoms. The hetero atom(s) is/are preferably selected from O, N, and the halogens, such as Cl or Br.

The organic compounds are preferably hydrocarbon compounds having one or more functional groups. Preferred functional groups include hydroxy, ester, acid, ether, glycidyl, and amine groups, combinations thereof, and salts of salt-forming functional groups, such as salts of acid and amine groups.

The organic compounds preferably have a number average molecular weight, $MW_n$, of at least 40, more preferably at least 60, preferably up to 500, more preferably up to 300, g/mole.

Examples of preferred organic compounds include (a) one or more multihydroxylated-aliphatic hydrocarbon compounds, esters thereof and/or monoepoxides thereof, and/or dimers, trimers and/or oligomers thereof, and/or halogenated and/or aminated derivatives thereof, (b) one or more organic acids preferably having from 1 to 10 carbon atoms, esters thereof, monoepoxides thereof and/or salts thereof, (c) one or more alkylene bisphenol compound(s) and/or epoxide(s), diols and/or chlorohydrins thereof, and/or (d) aniline, methylene dianiline, and/or phenol.

Preferred multihydroxylated-aliphatic hydrocarbon compounds include for example 1,2-ethanediol; 1,2-propanediol; 1,3-propanediol; 3-chloro-1,2-propanediol; 2-chloro-1,3-propanediol; 1,4-butanediol; 1,5-pentanediol; cyclohexanediols; 1,2-butanediol; 1,2-cyclohexanedimethanol; 1,2,3-propanetriol (also known as, and used herein interchangeable as, "glycerin", "glycerine", or "glycerol"); and mixtures thereof. Preferably, the MAHCs in the effluents treated according to the present invention include for example 1,2-ethanediol; 1,2-propanediol; 1,3-propanediol; and 1,2,3-propanetriol; with 1,2,3-propanetriol being most preferred.

Examples of esters of MAHCs include ethylene glycol monoacetate, propanediol monoacetates, glycerin monoacetates, glycerin monostearates, glycerin diacetates, and mixtures thereof.

Examples of monoepoxides of MAHCs include glycidol, dichloropropyl glycidyl ethers and epichlorohydrin.

Examples of organic acids having from 1 to 10 carbon atoms include formic acid, acetic acid, lactic acid and glycolic acid.

Examples of alkylene bisphenol compounds include bisphenol A and bisphenol F, as well as derivatives of these compounds perhaps also containing epoxide groups.

The organic compounds are preferably present in a total organic carbon (TOC) concentration in the range from about 50 ppm, more preferably from 200 ppm, even more preferably from about 500 ppm, and still more preferably from about 1000 ppm, preferably up to 2 weight-percent (20,000 ppm), more preferably up to 1 weight-percent (10,000 ppm), and even more preferably up to 0.5 weight-percent (5,000 ppm).

Preferred amounts of the preferred organic compounds are presented below in Table 1 based on the total weight of the respective organic compound in the aqueous brine solution.

TABLE 1

Preferred Concentrations of Organic Compounds in Parts-per-Million (ppm)

| Organic Compound | Preferred Minima | | | Preferred Maxima | | |
|---|---|---|---|---|---|---|
| Glycerine | 0 | 500 | 2,000 | 5,000 | 10,000 | 50,000 |
| Glycidol | 0 | 50 | 200 | 500 | 1,000 | 5,000 |
| Acetol | 0 | 10 | 40 | 100 | 300 | 1,000 |
| Bis-Ethers | 0 | 0.01 | 0.1 | 1 | 5 | 10 |
| Dichloropropyl glycidyl ethers | 0 | 0.01 | 0.1 | 11 | 22 | 33 |
| Epichlorohydrin | 0 | 0.01 | 0.1 | 1 | 10 | 100 |
| Bisphenol A | 0 | 100 | 500 | 5,000 | 10,000 | 50,000 |
| Bisphenol F | 0 | 100 | 500 | 5,000 | 10,000 | 50,000 |
| Diglycidyl ether of bisphenol A | 0 | 100 | 500 | 5,000 | 10,000 | 50,000 |
| Aniline | 0 | 100 | 500 | 5,000 | 10,000 | 50,000 |
| Methylene dianilin | 0 | 100 | 500 | 5,000 | 10,000 | 50,000 |
| Phenol | 0 | 100 | 500 | 5,000 | 10,000 | 50,000 |
| Formate | 0 | 1 | 5 | 75 | 100 | 200 |
| Acetate | 0 | 1 | 5 | 75 | 100 | 200 |
| Lactate | 0 | 1 | 5 | 75 | 100 | 200 |
| Glycolate | 0 | 1 | 5 | 75 | 100 | 200 |

The aqueous brine solution is preferably the product of a process wherein a base comprising sodium hydroxide is reacted with a compound having at least one chlorine atom per molecule to form one or more inorganic salts comprising at least 80, more preferably at least 90, even more preferably at least 95, and yet more preferably at least 99, yet more preferably at least 99.9, and yet even more preferably at least 99.99, weight-percent sodium chloride.

In one embodiment, the aqueous brine solution provided in step (1) is produced by epoxidation of chlorohydrin(s) by reacting chlorohydrins with sodium hydroxide. The chlorohydrins are preferably produced by contacting a reaction mixture comprising multihydroxylated-aliphatic hydrocarbon compounds and/or ester(s) thereof with at least one chlorinating feed stream comprising at least one chlorinating agent, optionally in the presence of water and one or more catalysts, in a reaction vessel under hydrochlorination conditions. The multihydroxylated-aliphatic hydrocarbon compounds preferably comprise glycerol. Preferably, at least 70 weight-percent of the multihydroxylated-aliphatic hydrocarbon compounds is glycerol. The glycerol is preferably sourced from the production of oleochemicals or biodiesel. Such processes are disclosed, for example, in WO 2006/020234, WO 2005/05147, WO 2006/100318, EP-A-1687248, and EP-A-1762556. The relevant disclosure of each of the above documents is incorporated herein by reference.

The brine sourced from the above dehydrochlorination process generally comprises one or more multihydroxylated-aliphatic hydrocarbon compounds, esters thereof and/or monoepoxides thereof, and/or dimers, trimers and/or oligomers thereof, and/or halogenated and/or aminated derivatives thereof. Preferred amounts of such compounds that may be present in the aqueous brine solution are specified above in Table 1.

In another embodiment, the aqueous brine solution provided in step (1) is produced by epoxidation of at least one polyphenol compound in the presence of an aqueous base comprising sodium hydroxide. In a preferred embodiment, the polyphenol compound comprises bisphenol A and the brine is preferably sourced from a TAFFY process for making higher molecular weight solid epoxy resins. In another preferred embodiment, the polyphenol compound comprises bisphenol A and the brine is preferably sourced from a process for making lower molecular weight liquid epoxy resins. In another preferred embodiment, the polyphenol compound is bisphenol F and/or one or more resols obtainable as a reaction product of diphenols with an aldehyde, such as formaldehyde and the brine is preferably sourced from a process for making liquid epoxy novolac. The epoxidation is preferably carried out by reacting at least one polyphenol with epichlorohydrin in the presence of an aqueous base comprising sodium hydroxide. The epichlorohydrin is preferably sourced from a process for making epichlorohydrin such as described above.

The brine sourced from the above epoxidation process generally comprises one or more polyphenol compounds and/or glycidyl ethers of the one or more polyphenol compounds. Preferred amounts of polyphenol compounds and epoxidized polyphenol compounds that may be present in the aqueous brine solution are specified above in Table 1.

In another preferred embodiment, the aqueous brine solution provided in step (1) is produced by contacting a vapor phase effluent comprising a chlorinating agent and one or more organic compounds with an aqueous base comprising sodium hydroxide for removing the chlorinating agent from the vapor phase effluent. In a preferred embodiment, the source of the vapor phase effluent is a chemical reactor. The chlorinating agent is preferably hydrogen chloride. The reaction mixture is preferably a liquid phase reaction mixture. The contacting is preferably carried out using a vapor-liquid contacting device.

In another preferred embodiment, the aqueous brine solution provided in step (1) is produced by neutralization of hydrogen chloride used to catalyze the reaction of aniline with formaldehyde to make methylene dianiline (MDA), which is useful for the production of (poly)isocyanates. The removal of hydrogen chloride is preferably carried out by a process described in the previous paragraph. The brine sourced from the neutralization step generally comprises aniline, methylene dianiline and/or phenol.

The aqueous brine solution containing aniline and/or methylene dianiline is preferably subjected to azeotropic distillation to remove aniline and/or methylene dianiline present in the aqueous brine solution prior to providing the aqueous brine solution in step (1). At least 50, more preferably at least 80, more preferably at least 90, weight-percent of aniline and/or methylene dianiline is removed from the aqueous brine solution prior to providing the aqueous brine solution in step (1). The aqueous brine solution provided in step (1) is preferably not been subjected to a stripping unit operation to remove aniline and/or methylene dianiline prior to the first redis solution operation according to the present invention.

Preferred amounts of aniline, methylene dianiline and phenol that may be present in the aqueous brine solution are specified above in Table 1.

Brine Purification

The brine purification process according to the present invention may include further brine purification steps downstream from the first redissolution operation as described in two-stage evaporative crystallization process above.

In a two-stage evaporative crystallization process brine purification, the at least one unit operation further comprises a second redissolution operation comprises:

(a) crystallizing sodium chloride in the first purified brine solution to form sodium chloride crystals and a second mother liquor, (b) separating the sodium chloride crystals from the second mother liquor, and (c) redissolving the separated sodium chloride crystals in an aqueous solution having an organic compound concentration substantially less than the organic compound concentration in the first purified brine solution to obtain a second purified brine solution having a total organic carbon (TOC) concentration less than the TOC concentration of the first purified brine solution.

The process of the present invention may include a second dissolution operation for further treating the aqueous brine solution treated via the first dissolution operation.

In further preferred embodiment, the process comprises treating the mother liquor separated in step (b) of the first redissolution operation and/or any second redissolution operation in a concentrating operation comprising:

(a) crystallizing sodium chloride in the first mother liquor and/or the second mother liquor to form sodium chloride crystals and a third mother liquor, (b) separating the sodium chloride crystals from the third mother liquor, and (c) redissolving the separated sodium chloride crystals in an aqueous solution having an organic compound concentration substantially less than the organic compound concentration in the aqueous brine solution provided in step (1) to obtain a third purified brine solution.

The third purified brine solution is preferably recycled to the first redissolution operation by combining the third brine solution with a sourced aqueous brine solution to form the aqueous brine solution provided in step (1).

The third dissolution operation preferably treats mother liquor from (1) the first redissolution operation in the case of one-stage evaporative crystallization process or (2) the first redissolution operation and the second redissolution operation in the case of two-stage evaporative crystallization process.

The amount of third mother liquor produced by the third redis solution operation is preferably not greater than 10, more preferably not greater than 5, weight-percent of the amount of aqueous brine solution provided in step (1).

The mother liquor purged from the process may be subjected to further unit operations. The further unit operations may comprise operations for reducing the concentration of organic compounds in the remaining mother liquor, such as operations for converting and/or removing the organic compounds present in the remaining mother liquor.

In a preferred embodiment, the remaining mother liquor may be treated via a biological oxidation process to convert the organic compounds in the mother liquor into more volatile oxidation fragments that may be separated from the mother liquor.

In another preferred embodiment, the remaining mother liquor may be subjected to chlorinolysis to oxidize the organic compounds in the mother liquor into more volatile oxidation fragments that may be separated from the mother liquor.

In yet another preferred embodiment, the remaining mother liquor may be subjected to carbon adsorption to remove the organic compounds from the mother liquor.

Two or more of the foregoing conversion and/or removal operations may be combined with each other or with other known unit operations in parallel or sequentially to further reduce the concentration of organic compounds in the mother liquor.

In another preferred embodiment, the brine obtained by redissolving the salt crystals obtained from the crystallizer, may be subjected to carbon adsorption or ion exchange to remove trace remaining organic compounds or ions in order to improve the performance of the chlor-alkali process that the purified brine may be fed to.

The purified brine recovered from such further unit operations may be used to make chlorine gas and/or hypochlorite and sodium hydroxide via a conventional chlor-alkali process and/or may recycled to the process according to the present invention as an aqueous brine washing solution as described above.

The sodium chloride crystals separated in step (b) of each redissolution operation are preferably washed with an aqueous brine washing solution containing at least 15, more preferably at least 17, even more preferably at least 20, and even more preferably at least 23, weight-percent sodium chloride and having a total organic carbon (TOC) concentration substantially less than the TOC in the aqueous brine solution provided in step (1). In a preferred embodiment, the weight ratio of the aqueous brine washing solution TOC concentration to the TOC concentration of the aqueous brine solution provided in step (1) is preferably 1:10, more preferably 1:100, and even more preferably 1:1000. The TOC concentration of the aqueous brine washing solution is preferably less than 50, more preferably less than 10, ppm. The aqueous brine washing solution is preferably a portion of the purified aqueous brine solution produced by the process according to the present invention. The amount of aqueous brine washing solution used in each unit operation of the process is preferably less than 15, more preferably less than 10, even more preferably less than 5, weight-percent of the total purified aqueous brine solution produced by the process. The total amount of aqueous brine washing solution used the brine purification process is preferably less than 50, more preferably less than 30, even more preferably less than 15, weight-percent of the total purified aqueous brine solution produced by the process.

Washing the sodium chloride crystals separated in step (b) with aqueous brine washing solution is preferably carried out simultaneously with the separation step (b). Washing is preferably carried out continuously during step (b).

The washed sodium chloride crystals of the present invention contains such low amounts of organic compounds that they may be further processed to make salts for other commercial or industrial uses.

In a preferred embodiment, the separation step (b) is carried out via centrifuging the slurry of sodium chloride crystals and aqueous brine solution from an upstream crystallization operation and/or treating the slurry of sodium chloride crystals and aqueous brine solution from an upstream crystallization operation in a hydrocyclone. In a preferred embodiment, the aqueous brine washing solution is introduced into the centrifuge and/or hydrocyclone device used to conduct the separation operation during the separation operation.

The crystallization operation is preferably conducted via forced circulation evaporative crystallization. Apparatus for conducting forced circulation evaporative crystallization are well-known in the industry.

In a preferred embodiment, water evaporated during forced circulation evaporative crystallization is used as at least a portion of the aqueous solution of redissolving step (c) in one or more redissolution operations. The water evaporated during forced circulation evaporative crystallization is preferably recovered via mechanical vapor recompression (MVR).

Each process step may be carried out in a batch, semi-batch or continuous mode. Each process step is preferably carried out in a continuous mode. The total process from providing the aqueous brine solution in step (1) to production of the purified brine solution according to the present invention is preferably carried out in a continuous mode.

The process and apparatus according to this invention may preferably be operated to yield at least 90, more preferably at least 95, and even more preferably at least 98, weight-percent of the amount of sodium chloride per unit volume of the aqueous brine solution provided in step (1). The aqueous brine solution is preferably treated according to the present invention to provide a sodium chloride purity of at least 80, more preferably at least 95, and even more preferably at least 99, percent.

In a preferred embodiment, the weight-ratio of the amount of organic compound to the amount of sodium chloride present in the first purified brine solution obtained in the first redissolution step is preferably less than one-tenth, more preferably less than one-hundredth, and even more preferably less than one-thousandth, of the weight-ratio of the amount of organic compound to the amount of sodium chloride present in the aqueous brine solution provided in step (1).

Figure 1:
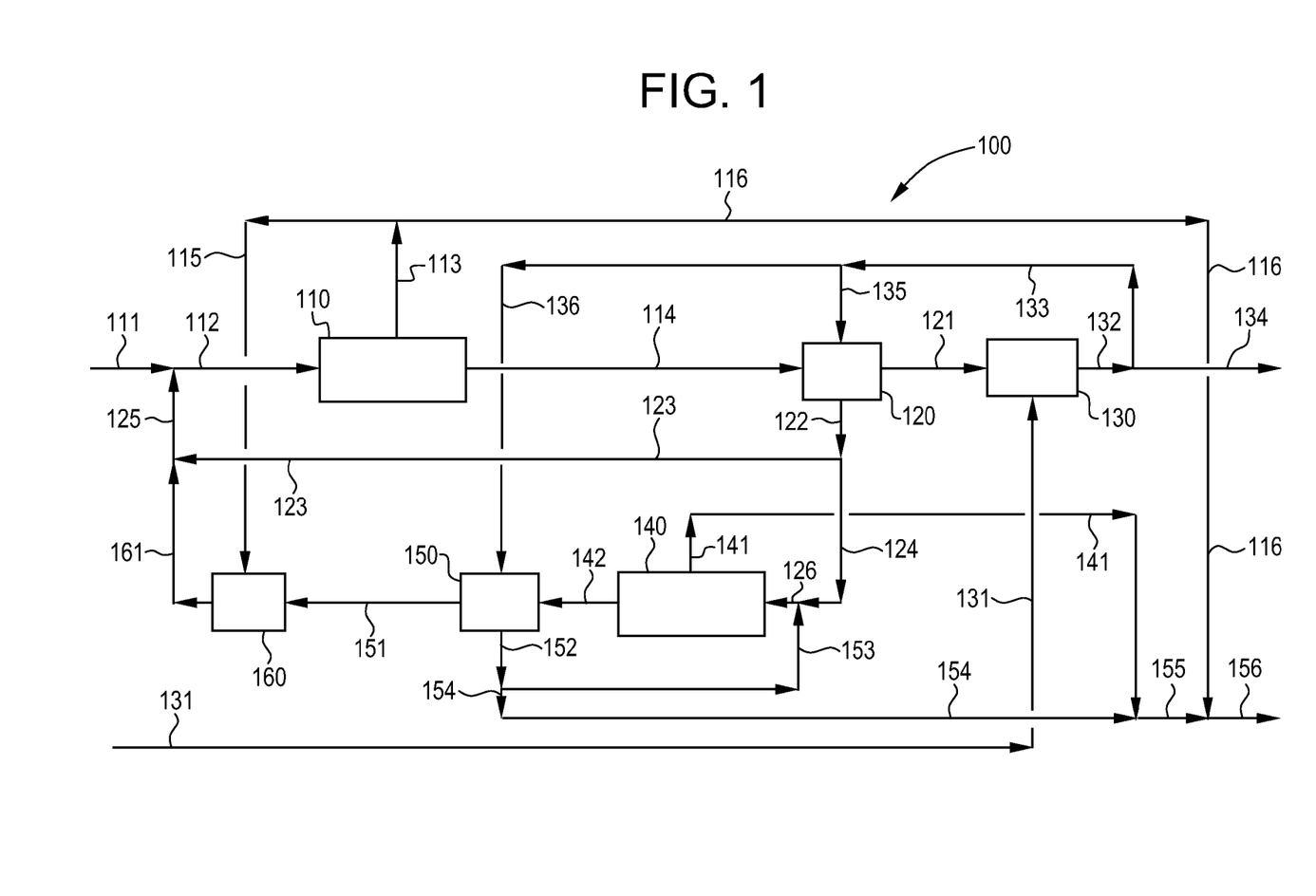
FIG. 1 is a process block flow diagram illustrating one embodiment of a one-stage evaporative crystallization process of the present invention.
Figure 2:
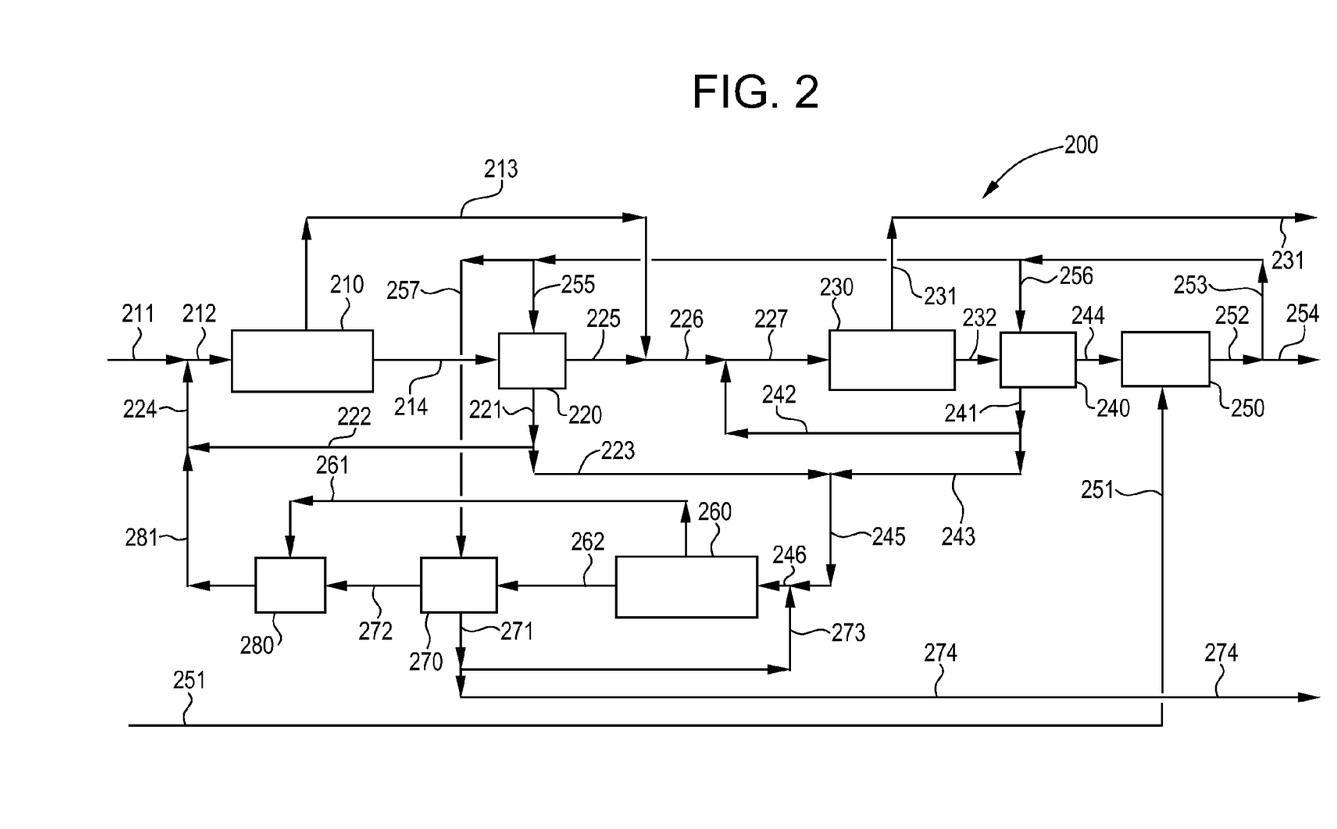
FIG. 2 is a process block flow diagram illustrating one embodiment of a two-stage evaporative crystallization process of the present invention.

The above-described process may be conducted using an apparatus according to the present invention. The apparatus is now described in more detail in reference to FIG. 1 for a one-stage evaporative crystallization process and FIG. 2 for a two-stage evaporative crystallization process. FIG. 1 and FIG. 2 are schematic diagrams showing the main features of illustrative apparatus that may be used and their respective feed streams.

As shown in FIG. 1, a one-stage evaporative crystallization process, generally indicated by numeral 100, is shown comprising a first forced circulation evaporative crystallizer 110, a first separation device 120, a first dilution vessel 130, a second forced circulation evaporative crystallizer 140, a second separation device 150, and a second dilution vessel 160. FIG. 1 shows a feed brine 111 and a recycle stream 125 forming a combined stream feed 112 is introduced into a first forced circulation evaporative crystallizer 110 where water is evaporated from the feed brine forming an overhead aqueous stream 113 while the feed brine undergoes agitation until the feed brine becomes supersaturated with inorganic salts, so that a slurry of brine and inorganic salt crystals is formed in crystallizer 110.

The slurry is conducted to a first separation device 120 via a first treated brine stream 114 for separating solids from liquids. The first separation device 120 separates the inorganic salt crystals from the aqueous liquid brine solution to form a first concentrated inorganic salt stream 121 rich in inorganic salt crystals leaving the device 120 and a first mother liquor stream 122, representing the remainder of the slurry 121, which is preferably substantially free of inorganic salt crystals leaving the device 120. The device 120 is preferably a centrifuge or hydrocyclone; or other separation device well known to those skilled in the art. The device 120 preferably performs continuous separation.

A portion of the first mother liquor stream 122 is preferably recycled to the first forced circulation evaporative crystallizer 110 as a first recycle stream 123 to provide additional water for suspending the inorganic salt crystals in the first crystallizer 110 and in the first slurry stream 114 to transport the crystals to the first separation device 120.

The inorganic salt crystals isolated by the first separation device 120 are preferably washed with a first brine wash stream 135 having an inorganic salt concentration close to, or equal to, saturation and an organic compound concentration substantially less than the organic compound concentration of the first mother liquor 122. The first brine wash 135 removes residual organic compounds on the surface of the inorganic salt crystals isolated by the first separation device 120 and conveys the residual organic compounds to the first mother liquor 122. The first brine wash 135 is preferably a portion 133 of the final treated brine 132. Another portion 124 of the first mother liquor 122 is described below.

The inorganic salt crystals of the first concentrated inorganic salt stream 121 exiting the first separation device 120 are conducted to a first dilution vessel 130 connected to a source of water 131 for dissolving the inorganic salt crystals in the first concentrated inorganic salt stream 121 to form treated brine solution 132. The source of water 131 is preferably a fresh water feed optionally purified to remove trace contaminants, or a purified process water stream.

The first dilution vessel 130 may be a stirred tank or merely a conduit; or other vessel well known to those skilled in the art. A first aqueous stream 113 is preferably water condensed from the first forced circulation evaporative crystallizer 110. The aqueous stream 113, having a relatively low inorganic salt concentration and a relatively low organic compound concentration, is preferably produced by mechanical vapor recompression MVR to increase the temperature of the vapor stream and heat-exchanging the compressed vapor stream with the first crystallizer 110 to provide heat to the first crystallizer and simultaneously liquefy the vapor stream. In this way, the combination of the first crystallizer 110, MVR (not shown) and heat-exchanger (not shown) functions as a multiple-effect evaporator. Excess heat in the liquefied vapor stream provides additional evaporative heat to downstream evaporative crystallizers.

A portion 124 of the first mother liquor 122 and a recycle stream 153 forming a combined feed stream 126 is preferably fed to a second forced circulation evaporative crystallizer 140 where water is evaporated from the mother liquor forming an overhead aqueous stream 142 while the mother liquor undergoes agitation until the mother liquor becomes supersaturated with inorganic salts, so that a slurry of concentrated mother liquor and inorganic salt crystals is formed in the crystallizer 140.

The slurry from the second crystallizer 140 is conducted to a second separation device 150 via a second treated mother liquor stream 142 for separating solids from liquids. The second separation device 150 separates the inorganic salt crystals from the concentrated mother liquor to form a second concentrated inorganic salt stream 151 rich in inorganic salt crystals leaving the device 150 and a second mother liquor stream 152, representing the remainder of the slurry 142, which is preferably substantially free of inorganic salt crystals leaving the device 150. The device 150 is preferably a centrifuge or hydrocyclone; or other separation device well known to those skilled in the art. The device 150 preferably performs continuous separation.

A portion 153 of the second mother liquor stream 152 is preferably recycled to the second forced circulation evaporative crystallizer 140 as a second recycle stream 153 to provide additional water for suspending the inorganic salt crystals in the third crystallizer 140 and in the second slurry stream 143 to transport the crystals to the second separation device 150. Another portion 154 of the second mother liquor stream 152 is preferably purged out of the process.

The inorganic salt crystals isolated by the second separation device 150 and present in the device 150 are preferably washed with a second brine wash stream 136 having an inorganic salt concentration close to, or equal to, saturation and an organic compound concentration substantially less than the organic compound concentration of the second mother liquor 152. The second brine wash stream 136 removes residual organic compounds on the surface of the inorganic salt crystals isolated by the second separation device 150 and conveys the residual organic compounds to the second mother liquor 152. The second brine wash stream 136 is preferably a portion 133 of the final treated brine 132.

The inorganic salt crystals of the second concentrated inorganic salt stream 151 exiting the second separation device 150 are redissolved in water in a second dilution vessel 160 to form a second treated brine stream 161 by combining, in vessel 160, the stream 151 with a portion 115 of the first aqueous stream 113 having a relatively low inorganic salt concentration and a relatively low organic compound concentration. A second portion 116 of the first aqueous stream 113 is purged from the process. The second treated brine stream 161 is combined with recycle stream 123 to form stream 125 which is combined with stream 111 to form feed stream 112 to the first forced circulation evaporative crystallizer 110. The second dilution vessel 160 may, for example, be a stirred tank or merely a conduit; or other vessel well known to those skilled in the art.

A second aqueous stream 141 is water condensed from the second crystallizer 140. The aqueous stream 141 is preferably produced by mechanical vapor recompression MVR of the vapor stream to increase the temperature of the vapor stream and heat-exchanging the compressed vapor stream with the second crystallizer 140 to provide heat to the second crystallizer 140 and simultaneously liquefy the vapor stream. In this way, the combination of the second crystallizer 140, MVR and heat-exchanger functions as a multiple-effect evaporator. Excess heat in the liquefied vapor stream provides additional evaporative heat to downstream evaporative crystallizers. The second aqueous stream 141 is preferably purged from the process by first combining with stream 154 to form stream 155. Then stream 155 is combined with stream 116 to form the purge stream 156.

The second and first crystallizers 140, 110 preferably function as multiple effect evaporators connected in series.

In the process of the present invention, devices capable of generating flow of the respective streams, such as pumps for liquid streams and/or MVRs for vapor streams, are provided in each stream in which energy is required to obtain the desired flow direction and flow rate. Such pumps and MVRs are well known and readily available in the industry.

To reduce energy and capital investment for heating the first and second crystallizers 110 and 140, the first crystallizer 110 shown in FIG. 1 is preferably operated at a pressure which is less than the operating pressure of the second crystallizer 140. This may be accomplished by creating a pressure differential between the mother liquor stream 124 entering the second crystallizer 140 and restricting the flow of the second treated brine stream 161 into the first crystallizer 110. By operating the second and first crystallizers 140, 110 at successively lower pressures in the order second crystallizer 140 pressure>first crystallizer 110 pressure, the heat of evaporation introduced into the second crystallizer 140 may be used to evaporate water in the first crystallizer 110 due to the successively lower temperature required to evaporate water in the respective second and first crystallizers, which is due to the successively lower vapor pressure in the second and first crystallizers, respectively. Heat energy utilization is optimized and the need for expensive heating elements for the second and first crystallizers is minimized or eliminated.

The portion 133 of the treated brine 132 solution is preferably conducted to the first and second separation devices 120 and 150 for use as the first and second brine wash streams 135 and 136.

The remainder 134 of the treated brine solution 132 is recovered for further purification, if necessary, or further processing. Such further processing may involve conducting the second treated brine solution to an electrolytic cell for conversion to chlorine gas or hypochlorite and sodium hydroxide via a conventional chlor-alkali process. Sodium hydroxide and/or chlorine or hypochlorite may be used in other industrial chemical processes, including processes upstream from the brine purification process according to this invention.

Preferred stream compositions for the process illustrated in FIG. 1 are presented below in Table 2.

TABLE 2

Preferred Stream Compositions

| Stream | Component | Preferred Minimum | | Preferred Maximum | | Units |
|---|---|---|---|---|---|---|
| 111[1] | TOC | 50 | 1,000 | 5,000 | 20,000 | ppm |
| | NaCl | 10 | 17 | 23 | saturated | wt % |
| 124[1] | TOC | 160 | 1,600 | 8000 | 50,000 | ppm |
| | NaCl | 10 | 17 | 23 | saturated | wt % |
| 156[2] | TOC | 1,500 | 8,000 | 60000 | 80,000 | ppm |
| | NaCl | 10 | 17 | 23 | saturated | wt % |
| 134[3] | TOC | 0 | 4 | 10 | 50 | ppm |
| | NaCl | 10 | 17 | 23 | saturated | wt % |

Notes for Table 2:
[1]Brine;
[2]Purge;
[3]Treated source

Preferred operating conditions for each crystallizer brine stream feed during the brine purification process according to FIG. 1 are summarized below in Table 3.

TABLE 3

Preferred Brine Stream Operating Conditions

| Stream | Parameter | Preferred Minimum | | Preferred Maximum | | Units |
|---|---|---|---|---|---|---|
| 111[1] | T[2] | 10 | 25 | 60 | 100 | ° C. |
| | P[3] | 50 | 300 | 500 | 800 | kPa |
| 124[1] | T[2] | 10 | 25 | 60 | 100 | ° C. |
| | P[3] | 50 | 300 | 500 | 800 | kPa |

Notes for Table 3:
[1]Brine;
[2]Temperature;
[3]Pressure

Preferred conditions in each of the evaporative crystallizers during the brine purification process according to FIG. 1 are summarized below in Table 4.

TABLE 4

Preferred Crystallizer Pressure Conditions in kPa

| Crystallizer | Preferred Minimum | | Preferred Maximum | |
|---|---|---|---|---|
| 110[1] | 40 | 50 | 100 | 200 |
| 140[2] | 80 | 90 | 100 | 200 |

Notes for Table 4:
[1]First crystallizer;
[2]Second crystallizer

The pressure in the second crystallizer 140 is preferably at least 5, more preferably at least 10, even more preferably at least 20, and yet more preferably at least 30, kPa greater than the pressure in the first crystallizer 110.

As shown in FIG. 2, a two-stage evaporative crystallization process, generally indicated by numeral 200, is shown comprising a first forced circulation evaporative crystallizer 210, a first separation device 220, a second forced circulation evaporative crystallizer 230, a second separation device 240, a first dilution vessel 250, a third forced circulation evaporative crystallizer 260, a third separation device 270, and a third dilution vessel 280. FIG. 2 shows a feed brine 211 and a recycle stream 224 forming a combined stream 212 is introduced into the first forced circulation evaporative crystallizer 210 where water is evaporated from the feed brine forming a first overhead aqueous stream 213 while the feed brine undergoes agitation until the feed brine becomes supersaturated with inorganic salts, so that a slurry of brine and inorganic salt crystals is formed in the crystallizer 210.

The slurry is conducted to a first separation device 220 via a first treated brine stream 214 for separating solids from liquids. The first separation device 220 separates the inorganic salt crystals from the aqueous liquid brine solution to form a first concentrated inorganic salt stream 225 rich in inorganic salt crystals leaving the device 220, and a first mother liquor stream 221, representing the remainder of the slurry 214, which is preferably substantially free of inorganic salt crystals leaving the device 220. The device 220 is preferably a centrifuge or hydrocyclone; or other separation device well known to those skilled in the art. The device 220 preferably performs continuous separation.

A portion 222 of the first mother liquor stream 221 is preferably recycled to the first forced circulation evaporative crystallizer 210 as a first recycle stream 222 to provide additional water for suspending the inorganic salt crystals in the first crystallizer 210 and in the first slurry stream 212 to transport the crystals to the first separation device 220. Another portion 223 of the first mother liquor stream 221 is described below.

The inorganic salt crystals isolated by the first separation device 220 and present in device 220 are preferably washed with a first brine wash stream 255 having an inorganic salt concentration close to, or equal to, saturation and an organic compound concentration substantially less than the organic compound concentration of the first mother liquor 221. The first brine wash 255 removes residual organic compounds on the surface of the inorganic salt crystals isolated by the first separation device 220 and conveys the residual organic compounds to the first mother liquor 221. The first brine wash 255 is preferably a portion 253 of the final treated brine 252 described below.

The inorganic salt crystals of the first concentrated inorganic salt stream 225 exiting the first separation device 220 are redissolved in water in a first dilution vessel not shown to form a first treated brine stream 226 by combining the stream 225 with a first aqueous stream 213 having a relatively low inorganic salt concentration and a relatively low organic compound concentration. The first dilution vessel may be a stirred tank or merely a conduit; or other vessel well known to those skilled in the art. The first aqueous stream 213 is preferably water condensed from the first forced circulation evaporative crystallizer 210. The aqueous stream 213 is preferably produced by mechanical vapor recompression (MVR) to increase the temperature of the vapor stream and heat-exchanging the compressed vapor stream with the first crystallizer 210 to provide heat to the first crystallizer and simultaneously liquefy the vapor stream. This way, the combination of the first crystallizer 210, MVR (not shown) and heat-exchanger (not shown) functions as a multiple-effect evaporator. Excess heat in the liquefied vapor stream provides additional evaporative heat to downstream evaporative crystallizers.

The first treated brine stream 226 and recycle stream 242 forming a combined stream 227 is fed to a second forced circulation evaporative crystallizer 230 where water is again evaporated from the first treated brine stream 227 forming an overhead stream 231 while the first treated brine undergoes agitation until the first treated brine becomes supersaturated with inorganic salts, so that a slurry of brine and inorganic salt crystals is formed in crystallizer 230.

The slurry is conducted to a second separation device 240 via a second treated brine stream 232 for separating solids from liquids. The second separation device 240 separates the inorganic salt crystals from the aqueous liquid brine solution to form a second concentrated inorganic salt stream 244 rich in inorganic salt crystals leaving the device 240 and a second mother liquor stream 241, representing the remainder of the slurry 232, which is preferably substantially free of inorganic salt crystals leaving the device 240. The second separation device 240 is again preferably a centrifuge or hydrocyclone; or other separation device well known to those skilled in the art. The second separation device 240 preferably performs continuous separation.

A portion 242 of the second mother liquor stream 241 is preferably recycled to the second forced circulation evaporative crystallizer 230 as a second recycle stream 242 to provide additional water for suspending the inorganic salt crystals in the second crystallizer 230 and in the second slurry stream 232 to transport the crystals to the second separation device 240. Another portion 243 of the second mother liquor stream 241 is described below.

The inorganic salt crystals isolated by the second separation device 240 and present in device 240 are preferably washed with a second brine wash stream 256 having an inorganic salt concentration close to, or equal to, saturation and an organic compound concentration substantially less than the organic compound concentration of the second mother liquor 241. The second brine wash 256 removes residual organic compounds on the surface of the inorganic salt crystals isolated by the second separation device 240 and conveys the residual organic compounds to the second mother liquor 241. The second brine wash 256 is preferably a portion 253 of the final treated brine 252 described below.

A portion 223 of the first mother liquor 221 and/or a portion 243 of the second mother liquor 241 is/are preferably fed to a third forced circulation evaporative crystallizer 260 where water is evaporated from the mother liquor forming an overhead stream 261 while the mother liquor undergoes agitation until the mother liquor becomes supersaturated with inorganic salts, so that a slurry of concentrated mother liquor and inorganic salt crystals is formed in crystallizer 260. The portion 223 and portion 243 may be combined into one mother liquor stream 245 prior to introducing them into the third crystallizer 260. Stream 245 may be combined with a recycle stream 273 to form a combined stream feed 246 as shown in FIG. 2.

The slurry from the third crystallizer 260 is conducted to a third separation device 270 via a third treated mother liquor stream 262 for separating solids from liquids. The third separation device 270 separates the inorganic salt crystals from the concentrated mother liquor to form a third concentrated inorganic salt stream 272 rich in inorganic salt crystals leaving device 270 and a third mother liquor stream 271, representing the remainder of the slurry 262, which is preferably substantially free of inorganic salt crystals leaving the device 270. The device 270 is preferably a centrifuge or hydrocyclone; or other separation device well known to those skilled in the art. The device 270 preferably performs continuous separation.

A portion 273 of the third mother liquor stream 271 is preferably recycled to the third forced circulation evaporative crystallizer 270 as a third recycle stream 273 to provide additional water for suspending the inorganic salt crystals in the third crystallizer 260 and in the third slurry stream 262 to transport the crystals to the third separation device 270. The remaining portion 274 of the third mother liquor 271 may be purged out of the process.

The inorganic salt crystals isolated by the third separation device 270 are preferably washed with a third brine wash stream 257 having an inorganic salt concentration close to, or equal to, saturation and an organic compound concentration substantially less than the organic compound concentration of the third mother liquor 271. The third brine wash stream 257 removes residual organic compounds on the surface of the inorganic salt crystals isolated by the third separation device 270 and conveys the residual organic compounds to the third mother liquor 271. The third brine wash stream 257 is preferably a portion 253 of the final treated brine 252.

The inorganic salt crystals of the third concentrated inorganic salt stream 272 exiting the third separation device 270 are redissolved in water in a third dilution vessel 280 to form a third treated brine stream 281 by combining, in vessel 280, the stream 272 with a third aqueous stream 261 having a relatively low inorganic salt concentration and a relatively low organic compound concentration. The third dilution vessel 280 may, for example, be a stirred tank or merely a conduit; or other vessel well known to those skilled in the art. The third aqueous stream 261 is preferably water condensed from the third crystallizer 260. The aqueous stream 261 is preferably produced by mechanical vapor recompression (MVR) of the vapor stream to increase the temperature of the vapor stream and heat-exchanging the compressed vapor stream with the third crystallizer 260 to provide heat to the third crystallizer 260 and simultaneously liquefy the vapor stream. In this way, the combination of the third crystallizer 260, MVR (not shown) and heat-exchanger (not shown) functions as a multiple-effect evaporator. Excess heat in the liquefied vapor stream provides additional evaporative heat to downstream evaporative crystallizers.

The third and first crystallizers 260, 210 respectively, preferably function as multiple effect evaporators connected in series.

In the process of the present invention, devices capable of generating flow of the respective streams, such as pumps for liquid streams and/or MVRs for vapor streams, are provided in each stream in which energy is required to obtain the desired flow direction and flow rate. Such pumps and MVRs are well known and readily available in the industry.

To reduce energy and capital investment for heating the first and second crystallizers 210, 230, respectively, the first crystallizer 210 shown in FIG. 2 is preferably operated at a pressure which is less than the operating pressure of the third crystallizer 260 and the second crystallizer 230 is preferably operated at a pressure which is less than the operating pressure of the first crystallizer 210. This may be accomplished by creating a pressure differential between the mother liquor stream 245 entering the third crystallizer 260 in stream 246 and second treated brine stream 262 greater than required to maintain minimum flow rates, restricting the flow of the third treated brine stream 281 into the first crystallizer 210 and restricting the flow of the first treated brine stream 226 into the second crystallizer 230 in stream 227. By operating the third, first and second crystallizers 260, 210, 230 respectively, at successively lower pressures in the order third crystallizer 260 pressure>first crystallizer 210 pressure>second crystallizer 230 pressure, the heat of evaporation introduced into the third crystallizer 260 may be used to evaporate water in the first crystallizer 210 and in the second crystallizer 230 due to the successively lower temperature required to evaporate water in the respective first and second crystallizers, which is due to the successively lower vapor pressure in the first and second crystallizers, respectively. Heat energy utilization is optimized and the need for expensive heating elements for the first and second crystallizers is minimized or eliminated.

The second concentrated inorganic salt stream 244 is conducted to a second dilution vessel 250 connected to a source of water 251 for dissolving the inorganic salt crystals in the second concentrated inorganic salt stream 244 to form a second treated brine solution 252. The source of water 251 is preferably a fresh water feed optionally purified to remove trace contaminants, or a purified process water stream.

A portion 253 of the second treated brine solution 252 is preferably conducted to the first, second and third separation devices 220, 240 and 270 respectively for use as the first, second and third brine wash streams 255, 256, and 257, respectively.

The remainder 254 of the second treated brine solution 252 is recovered for further purification, if necessary, or further processing. Such further processing may involve conducting the second treated brine solution 252 to an electrolytic cell for conversion to chlorine gas or hypochlorite and sodium hydroxide via a conventional chlor-alkali process. Sodium hydroxide and/or chlorine or hypochlorite may be used in other industrial chemical processes, including processes upstream from the brine purification process according to this invention.

Preferred stream compositions for the process illustrated in FIG. 2 are presented below in Table 5.

TABLE 5

Preferred Stream Compositions

| Stream | Component | Preferred Minimum | | Preferred Maximum | | Units |
|---|---|---|---|---|---|---|
| 211[1] | TOC | 50 | 1,000 | 5,000 | 20,000 | ppm |
| | NaCl | 10 | 17 | 23 | saturated | wt % |
| 226[1] | TOC | 10 | 20 | 1,000 | 2,000 | ppm |
| | NaCl | 10 | 17 | 23 | saturated | wt. % |
| 245[1] | TOC | 156 | 1,560 | 8,000 | 50,000 | ppm |
| | NaCl | 10 | 17 | 23 | saturated | wt % |
| 274[2] | TOC | 1,560 | 7,800 | 62,600 | 78,000 | ppm |
| | NaCl | 10 | 17 | 23 | saturated | wt % |
| 254[3] | TOC | 0 | 4 | 10 | 50 | ppm |
| | NaCl | 10 | 17 | 23 | saturated | wt % |

Notes for Table 5:
[1]Brine;
[2]Purge;
[3]Treated source

Preferred operating conditions for each crystallizer brine stream feed during the brine purification process according to FIG. 2 are summarized below in Table 6.

TABLE 6

Preferred Brine Stream Operating Conditions

| Stream | Parameter | Preferred Minimum | | Preferred Maximum | | Units |
|---|---|---|---|---|---|---|
| 211[1] | T[2] | 10 | 25 | 60 | 100 | ° C. |
| | P[3] | 50 | 300 | 500 | 800 | kPa |

TABLE 6-continued

Preferred Brine Stream Operating Conditions

| Stream | Parameter | Preferred Minimum | | Preferred Maximum | | Units |
|---|---|---|---|---|---|---|
| 226[1] | T[2] | 10 | 25 | 60 | 100 | ° C. |
| | P[3] | 50 | 300 | 500 | 800 | kPa |
| 245[1] | T[2] | 10 | 25 | 60 | 100 | ° C. |
| | P[3] | 50 | 300 | 500 | 800 | kPa |

Notes for Table 6:
[1]Brine;
[2]Temperature;
[3]Pressure

Preferred conditions in each of the evaporative crystallizers during the brine purification process according to FIG. 2 are summarized below in Table 7.

TABLE 7

Preferred Crystallizer Pressure Conditions in kPa

| Crystallizer | Preferred Minimum | | Preferred Maximum | |
|---|---|---|---|---|
| 210[1] | 40 | 50 | 100 | 200 |
| 230[2] | 10 | 20 | 100 | 200 |
| 260[3] | 80 | 90 | 100 | 200 |

Notes for Table 7:
[1]First crystallizer;
[2]Second crystallizer;
[3]Third crystallizer The pressure in the first crystallizer 210 is preferably at least about 5, more preferably at least about 10, and even more preferably at least about 20, kPa greater than the pressure in the second crystallizer 230. The pressure in the third crystallizer 260 is preferably at least about 5, more preferably at least about 10, even more preferably at least about 20, and yet more preferably at least about 30, kPa greater than the pressure in the first crystallizer 210.

Another aspect of the present invention is a chemical process apparatus for producing purified brine comprising a chemical reaction apparatus suitable for reacting a chlorine-atom containing compound with sodium hydroxide to make an aqueous brine solution and a brine purification apparatus according to the present invention, wherein the chemical reaction apparatus is connected to the brine purification apparatus for conducting an aqueous brine solution from the chemical reaction apparatus to the brine purification apparatus and the chemical reaction apparatus is connected to a source of aqueous sodium hydroxide solution for conducting the aqueous sodium hydroxide solution to the chemical reaction apparatus. The chemical reaction apparatus may be an apparatus suitable for making epichlorohydrin, epoxy resin(s) or methylene dianiline.

When the chemical reaction apparatus is suitable for making epichlorohydrin by reacting chlorohydrin(s) with sodium hydroxide (i.e., via dehydrochlorination), the chemical process apparatus may further comprise a hydrochlorination apparatus suitable for making chlorohydrin. The hydrochlorination apparatus is then preferably connected to the chemical reactor apparatus for conducting a stream comprising chlorohydrin(s) from the apparatus for making chlorohydrin(s) to the chemical reactor apparatus.

All references cited herein are specifically incorporated by reference herein.

The following examples are for illustrative purposes only and are not intended to limit the scope of the present invention.

Example 1

In this Example 1, brine purification is carried out according to the present invention via a semi-batch crystallization process.

Laboratory scale evaporative crystallizer equipment is configured using a 9 liter jacketed round-bottom glass kettle, equipped with a stirrer, a glass draft-tube, heating-mantle controlled by a thermocouple. Hot oil is circulated in the jacketed vessel to help maintain process temperature at approximately 95° C. The heating mantle contributes the additional heat required to boil off the water and concentrate the brine solution to saturation point.

An initial charge of 2.98 kg of a synthetic brine solution containing of 29.98 weight-percent NaCl, 3.11 weight-percent glycerol, and 66.91 weight-percent water is introduced into the glass kettle of the evaporative crystallizer. The brine solution is heated in the evaporative crystallizer to 110° C. to evaporate the water from the solution. The water vapor is vented, cooled to 15° C. with a chilled-water atmospheric condenser, condensed and collected in a separated vessel.

A synthetic brine feed solution containing 18.77 weight-percent NaCl, 0.51 weight-percent glycerol, and 80.72 weight-percent water, is continuously added to the brine solution in the glass kettle of the evaporative crystallizer to maintain liquid level in the evaporative crystallizer as the water is evaporated. The brine feed rate is based on measurement of the water removed by evaporation, condensed and collected in a graduated vessel. The process is closely watched to maintain a constant level of one to two inches above the draft tube.

During this process, the brine solution becomes supersaturated with NaCl and NaCl crystals begin forming in the solution. The process is continued to allow the crystals to grow to an observable size in the brine solution so that a slurry of crystals in brine is formed. Approximately 265 minutes run time after the onset of water condensation is required to form the slurry.

At the end of the run time, the brine feed is stopped, all heating is removed, and the vessel is allowed to cool to ambient temperature. The agitator remains running to keep the salt slurry in suspension. The contents of the kettle were emptied and vacuum filtered to separate the crystallized salt from the mother liquor. The weight of each separated component is recorded for mass balance calculation and all components are analyzed.

The mass balance calculations show that the above process evaporates 3.98 kg condensate containing 0.0077 weight-percent glycerol, is fed 5.07 kg brine, and produces 4.07 kg slurry, which consists of 0.89 kg NaCl crystals and 3.18 kg of mother liquor. The crystals, separated from the mother liquor using slight-vacuum filtration, contain 95.78 weight-percent NaCl and 0.30 weight-percent glycerol. The mother liquor contains 31.17 weight-percent NaCl and 3.61 weight-percent glycerol. The crystals are further washed with equal weight purified brine containing no glycerol. This salt wash process reduces the glycerol in the washed NaCl crystals to 0.041 weight-percent. In terms of 20 weight-percent NaCl treated brine solution, the glycerol concentration is 0.0082 weight-percent or 32 ppm of total organic carbon (TOC).

Example 2

In this Example 2 according to the present invention, a semi-batch crystallization process is conducted according to Example 1 with the following exceptions.

Instead of washing the salt crystals with purified brine containing no glycerol to remove remaining impurities from the crystals, the unwashed salt crystals collected in Example 1 are re-diluted with purified water and re-used as a second start-up brine solution in a second semi-batch crystallization process using the same lab evaporative crystallizer equipment as that used in Example 1. The second start-up brine solution weighs 4.81 kg and contains of 14.80 weight-percent NaCl, 0.038 weight-percent glycerol, and 85.33 weight-percent water.

The start-up brine solution is heated in the evaporative crystallizer to 110° C. to evaporate the water from the solution. The water vapor is vented, cooled to 15° C. with a chilled-water atmospheric condenser, condensed and collected in a separate vessel. In contrast to Example 1, no brine feed is added during this re-crystallization process.

During this process, the brine solution becomes supersaturated with NaCl and NaCl crystals begin forming in the solution. The process is continued to allow the crystals to grow to an observable size in the brine solution so that a slurry of crystals in brine is formed. Approximately 200 minutes run time after the onset of water condensation is required to form the slurry.

At the end of the run time, heating is removed and the vessel is allowed to cool to ambient temperature. The agitator remained running to keep the salt slurry in suspension. The contents of the kettle are emptied and vacuum filtered to separate the crystallized salt from the mother liquor. The weight of each separated component is recorded for mass balance calculation and all components are analyzed.

The mass balance calculations show that the above process evaporates 3.49 kg condensate containing of 0.002 weight-percent glycerol and produces 1.32 kg slurry, which consists of 0.54 kg NaCl crystals and 0.78 kg mother liquor. The NaCl crystals, separated from the mother liquor using slight-vacuum filtration, contain 92.36 weight-percent NaCl and 0.031 weight-percent glycerol. The mother liquor contains 27.16 weight-percent NaCl and 0.21 weight-percent glycerol.

The crystals filtered from the mother liquor are washed with an equal weight of purified brine containing no glycerol. This salt wash process reduces the glycerol in the washed crystals to 0.0056 weight-percent. In terms of 20 weight-percent NaCl treated brine solution, the glycerol concentration is 0.0011 weight-percent or 4 ppm TOC.

Example 3

In this Example 3 according to the present invention, a continuous brine purification process is simulated via computer modeling software based on data obtained in Examples 1 and 2 and data generated by the computer model for simulation of continuous processing equipment. The process simulation is based on the process flow diagram shown in FIG. 2 described above. The computer-generated data for each stream identified in FIG. 2 is presented below in Table 8.

TABLE 8

Computer-Generated Data Based on Example 3

| Stream | Rate (kg/hour) | TOC (ppm) | Glycerol (wt %) | NaCl (wt %) | Water (wt %) |
|---|---|---|---|---|---|
| 211[1] | 1.00 | 1450 | 0.37 | 17.70 | 81.93 |
| 214[2] | 0.96 | 20440 | 5.22 | 42.37 | 52.41 |
| 221[3] | 0.79 | 24722 | 6.32 | 26.70 | 66.98 |
| 222[4] | 0.74 | 24722 | 6.32 | 26.70 | 66.98 |
| 223[5] | 0.06 | 22150 | 5.66 | 26.89 | 67.45 |

TABLE 8-continued

Computer-Generated Data Based on Example 3

| Stream | Rate (kg/hour) | TOC (ppm) | Glycerol (wt %) | NaCl (wt %) | Water (wt %) |
|---|---|---|---|---|---|
| 225[6] | 0.21 | 200 | 0.05 | 97.00 | 2.95 |
| 213[7] | 0.90 | 50 | 0.01 | 0.00 | 99.99 |
| 226[1] | 0.99 | 79 | 0.02 | 19.03 | 80.95 |
| 232[2] | 0.93 | 1165 | 0.30 | 44.31 | 55.40 |
| 241[3] | 0.76 | 1417 | 0.36 | 28.40 | 71.24 |
| 242[4] | 0.71 | 1417 | 0.36 | 28.40 | 71.24 |
| 243[5] | 0.05 | 1417 | 0.36 | 28.40 | 71.24 |
| 244[6] | 0.21 | 22 | 0.01 | 97.00 | 2.99 |
| 231[7] | 0.89 | 8 | 0.00 | 0.00 | 100.00 |
| 251[8] | 0.84 | 0 | 0.00 | 0.00 | 100.00 |
| 255[9] | 0.04 | 3.26 | 0.00 | 20.00 | 80.00 |
| 256[9] | 0.04 | 3.25 | 0.00 | 20.00 | 80.00 |
| 253[10] | 0.96 | 4 | 0.00 | 20.00 | 80.00 |
| 245[1] | 0.11 | 11686 | 2.99 | 27.65 | 69.40 |
| 262[2] | 0.14 |  | 32.83 | 34.42 | 32.70 |
| 271[3] | 0.12 |  | 39.74 | 17.18 | 43.09 |
| 273[4] | 0.11 |  | 39.74 | 17.18 | 43.09 |
| 272[6] | 0.03 | 178 | 0.05 | 97.00 | 2.95 |
| 261[7] | 0.08 | 50 | 0.01 | 0.00 | 99.99 |
| 281[11] | 0.11 | 87 | 0.01 | 28.00 | 71.97 |
| 274[5] | 0.01 |  | 39.74 | 17.18 | 43.09 |

Notes for Table 8:
[1]Brine;
[2]Crystallizer Bottoms;
[3]Mother liquor;
[4]Recycle;
[5]Purge;
[6]Solids;
[7]Overheads;
[8]Water;
[9]Wash brine;
[10]Treated source;
[11]Brine recycle The crystallization conditions in each of the evaporative crystallizers is provided in Table 9.

TABLE 9

Crystallization Conditions in Each Crystallizer According to Example 3

| Crystallizer | 210 (First) | 230 (Second) | 260 (Third) |
|---|---|---|---|
| Wt. % Solids | 21.0 | 21.7 | 20.9 |
| Wt. % Liquids | 79.0 | 78.3 | 79.1 |
| Recycling Ratio | 0.93 | 0.93 | 0.92 |

Mother liquor purge streams from the first and second crystallizer are combined and fed to the third crystallizer. The third crystallizer serves as a mother liquor concentrator to reduce the overall brine purge stream and minimize NaCl yield loss. The final brine purge stream is concentrated to 39.37% glycerol so that the overall purged rate can be reduced to 1 weight-percent of the brine feed rate as shown in stream 274.

The salt crystals and condensate produced in this third crystallizer are combined and clean enough to be recycled back to the first crystallizer as shown by stream 281. Recycling the NaCl crystals and condensate increases the NaCl recovery to 94% as shown in stream 254.

The data for the overall brine purification process according to Example 3 is summarized below in Table 10.

TABLE 10

Net Process Stream Data for Purification According to Example 3

| Stream | Rate (kg/hour) | TOC (ppm) | Glycerol (wt. %) | NaCl (wt. %) |
|---|---|---|---|---|
| Fresh water feed | 0.82 | 0 | 0.00 | 0.00 |
| Process water reuse | 0.87 | 8 | <0.01 | 0.00 |
| Brine feed | 1.00 | 1450 | 0.37 | 17.70 |
| Treated Brine | 0.94 | 4 | <0.01 | 17.28 |
| Purged brine | 0.01 | 154,161 | 39.37 | 17.28 |

Although this process requires freshwater intake for diluting the crystal produced by the second crystallizer by as much as 82% of the brine feed as shown in stream 251, a similar quantity of condensate is also produced by the second crystallizer (re-crystallization step). This condensate contains low enough TOC (8 ppm), as shown by stream 231, and can be re-used as process water. The overall process water demand is therefore minimized Example 4

In this Example 4 according to the present invention, a semi-batch crystallization process is conducted according to Example 1 with the following exceptions:
1. Instead of a synthetic brine solution as described in Example 1, an actual brine solution, generated from epichlorohydrin process, is used as an initial charge and feed solution to the laboratory scale evaporative crystallizer equipment; and
2. The crystallization process is stopped when the total organic carbon (TOC) concentration in the mother liquor reaches about 5000 ppm.

An initial charge of 2.25 kg of the actual containing 20.86 weight-percent NaCl, 1220 ppm (0.312 weight-percent glycerol equivalent) TOC concentration and 78.83 weight-percent water. The brine solution is heated in the evaporative crystallizer to 110° C. to evaporate the water from the solution. The water vapor is vented, cooled to 15° C. with a chilled-water atmospheric condenser, condensed and collected in a separated vessel.

The same actual brine solution is also used as feed solution and is continuously added to the brine solution in the glass kettle of the evaporative crystallizer to maintain liquid level in the evaporative crystallizer as the water is evaporated. The brine feed rate is based on measurement of the water removed by evaporation, condensed and collected in a graduated vessel. The process is closely watched to maintain a constant level of one to two inches above the draft tube.

During this process, the brine solution becomes supersaturated with NaCl and NaCl crystals begin forming in the solution. The process is continued to allow the crystals to grow to an observable size in the brine solution so that a slurry of crystals in brine is formed. Approximately 245 minutes run time after the onset of water condensation is required to form the slurry.

At the end of the run time, the brine feed is stopped, all heating is removed, and the vessel is allowed to cool to ambient temperature. The agitator remains running to keep the salt slurry in suspension. The contents of the kettle were emptied and vacuum filtered to separate the crystallized salt from the mother liquor. The weight of each separated component is recorded for mass balance calculation and all components are analyzed.

The mass balance calculations show that the above process evaporates 3.09 kg condensate containing 21 ppm TOC concentration, is fed 2.56 kg brine, and produces 1.72 kg slurry, which consists of 0.74 kg NaCl crystals and 0.988 kg of mother liquor. The crystals, separated from the mother liquor using slight-vacuum filtration, contain 93.89 weight-percent NaCl and 626 ppm TOC concentration. The mother liquor contains 31.57 weight-percent NaCl and 5400 ppm TOC concentration. The crystals are further washed with equal weight purified brine containing no glycerol. This salt wash process reduces the glycerol in the washed NaCl crystals to 35 ppm TOC concentration. In terms of 20 weight-percent NaCl treated brine solution, the TOC concentration is 7 ppm.

This Example 4 shows that treated brine with TOC concentration below 10 ppm is obtainable from a one-step evaporative-crystallization process of the actual brine solution from epichlorohydrin process when the TOC concentration in the NaCl crystallization process mother liquor is kept low in this care about 5400 ppm.

Example 5

Example 4 shows that treated brine with TOC concentration below 10 ppm is obtainable from a one-step evaporative-crystallization process of the actual brine solution from epichlorohydrin process when the TOC concentration in the NaCl crystallization process mother liquor is kept low in this care about 5400 ppm.

In this Example 5 according to the present invention, a continuous brine purification process simulation via computer modeling software based on data obtained in Examples 4 and data generated by the computer model for simulation of continuous processing equipment. The process simulation is based on the process flow diagram shown in FIG. 1 described above. The computer-generated data for each stream identified in FIG. 1 is presented below in Table 11.

TABLE 11

Computer-Generated Data Based on Example 5

| Stream | Rate (kg/hour) | TOC (ppm) | Glycerol equivalent (wt %) | NaCl (wt %) | Water (wt %) |
|---|---|---|---|---|---|
| 111[1] | 1.00 | 1000 | 0.26 | 20.00 | 79.74 |
| 114[2] | 1.01 | 3109 | 0.79 | 42.63 | 56.57 |
| 122[3] | 0.84 | 3708 | 0.95 | 28.23 | 70.82 |
| 123[4] | 0.57 | 3708 | 0.95 | 28.23 | 70.82 |
| 124[1] | 0.27 | 3708 | 0.95 | 28.23 | 70.82 |
| 121[6] | 0.21 | 40 | 0.01 | 97.00 | 2.99 |
| 113[7] | 0.81 | 8 | 0.00 | 0.00 | 100.00 |
| 131[8] | 0.83 | 0 | 0.00 | 0.00 | 100.00 |
| 135[19] | 0.04 | 8 | 0.00 | 20.00 | 80.00 |
| 136[9] | 0.02 | 8 | 0.00 | 20.00 | 80.00 |
| 134[10] | 0.98 | 8 | 0.00 | 20.00 | 80.00 |
| 115[7] | 0.19 | 8 | 0.00 | 0 | 100.00 |
| 142[2] | 0.36 | 40547 | 10.36 | 40.35 | 49.28 |
| 152[3] | 0.30 | 48730 | 12.45 | 24.95 | 62.60 |
| 153[4] | 0.28 | 48730 | 12.45 | 24.95 | 62.60 |
| 151[6] | 0.08 | 178 | 0.05 | 97.00 | 2.95 |
| 141[7] | 0.19 | 150 | 0.04 | 0.00 | 99.96 |
| 116[7] | 0.62 | 8 | 0.00 | 0.00 | 100.00 |
| 161[11] | 0.24 | 57 | 0.02 | 28.03 | 72.05 |
| 156[5] | 0.83 | 1197 | 0.31 | 0.59 | 99.10 |
| 154[5] | 0.02 | 48730 | 12.45 | 24.95 | 62.60 |

Notes for Table 5:
[1] Brine;
[2] Crystallizer Bottoms;
[3] Mother liquor;
[4] Recycle;
[5] Purge;
[6] Solids;
[7] Overheads;
[8] Water;
[9] Wash brine;
[10] Treated source;
[11] Brine recycle The crystallization conditions in each of the evaporative crystallizers is provided in Table 12.

TABLE 12

Crystallization Conditions in Each Crystallizer According to Example 5

| Crystallizer | 110 (First) | 140 (Second) |
|---|---|---|
| Wt. % Solids | 19.9 | 20.2 |
| Wt. % Liquids | 80.1 | 79.8 |
| Recycling Ratio | 0.68 | 0.94 |

Mother liquor purge streams from the first separator 120 is fed to the second crystallizer 140. The second crystallizer serves as a mother liquor concentrator to reduce the overall brine purge stream and minimize NaCl yield loss. The final brine purge stream is concentrated to 12.5% glycerol so that the overall purged rate can be reduced to 2.5 weight-percent of the brine feed rate as shown in stream 154

Final purged brine stream 154 can be diluted to meet waste-water discharge specification by mixing the access condensate from the first crystallizer 116 and the condensate from the second crystallizer.

The salt crystals and condensate produced in this second crystallizer are clean enough to be recycled back to the first crystallizer as shown by stream 161. Recycling the NaCl crystals and condensate increases the NaCl recovery to 97.5% as shown in stream 134.

The data for the overall brine purification process according to Example 5 is summarized below in Table 13.

TABLE 13

Net Process Stream Data for Purification According to Example 5

| Stream | Rate (kg/hour) | TOC (ppm) | Glycerol (wt. %) | NaCl (wt. %) |
|---|---|---|---|---|
| Fresh water feed | 0.83 | 0 | 0.00 | 0.00 |
| Process water reuse 1 | 0.62 | 8 | <0.01 | 0.00 |
| Process water reuse 2 | 0.19 | 150 | 0.04 | 0.00 |
| Brine feed | 1.00 | 1000 | 0.26 | 20.00 |
| Treated Brine | 0.98 | 8 | <0.01 | 17.28 |
| Purged brine | 0.01 | 154,161 | 39.37 | 17.28 |

Although this process requires freshwater intake for diluting the crystal produced by the second crystallizer by as much as 83% of the brine feed as shown in stream 131, a similar quantity of condensate is also produced by the second crystallizer (re-crystallization step). Most of this condensate contain low enough TOC (8 ppm), as shown by stream 116, and can be re-used as process water. The overall process water demand is therefore minimized As can be seen from the foregoing, the present invention is capable of obtaining a recovery of aqueous brine having very low TOC concentrations while minimizing the amount of brine requiring further treatment. The process according to the present invention also minimizes consumption and contamination of fresh water and does not introduce chemicals requiring further treatment or resulting in a net reduction of chlorine gas or hypochlorite production.

The advantages the above processes of the present invention include:

1. High NaCl recovery, where more than 90 weight-percent of the brine feed may be recovered as treated brine with TOC below 10 ppm;
2. Process water re-use, where most of the freshwater used in the process can be replaced by the condensate produced in the second crystallizer; and
3. Low brine purge, with the purge as low as 1 weight-percent of the brine feed.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A brine purification apparatus comprising:
   (A) a first forced circulation evaporative crystallizer;
   (B) a second forced circulation evaporative crystallizer;
   (C) a first separation device for separating solids from liquids;
   (D) a second separation device for separating solids from liquids;
   (E) a first dilution vessel; and
   (F) a second dilution vessel,
   wherein the first forced circulation evaporative crystallizer is connected to the first separation device for conducting a slurry stream comprising an aqueous liquid and crystals from the first forced circulation evaporative crystallizer to the first separation device;
   wherein the first separation device is connected to the first dilution vessel for conducting crystals from the first separation device to the first dilution vessel;
   wherein the first dilution vessel is connected to a source of aqueous liquid for re-dissolving crystals received from the first separation device;
   wherein the first dilution vessel is connected to the second forced circulation evaporative crystallizer for conducting a brine comprising re-dissolved crystals from the first dilution vessel to the second forced circulation evaporative crystallizer;
   wherein the second forced circulation evaporative crystallizer is connected to the second separation vessel for conducting a slurry stream comprising an aqueous liquid and crystals from the second forced circulation evaporative crystallizer to the second separation device;
   wherein the second separation device is connected to the second dilution vessel for conducting crystals from the second separation device to the second dilution vessel;
   wherein the second dilution vessel is connected to a source of aqueous liquid for re-dissolving crystals received from the second separation device; and
   wherein the second dilution vessel is connected to the first separation device for conducting a brine comprising re-dissolved crystals from the second dilution vessel to the first separation device for washing the crystals separated by the first separation device.

2. The apparatus of claim 1, wherein the apparatus further comprises:
   (G) a third forced circulation evaporative crystallizer;
   (H) a third separation device; and
   (I) a third dilution vessel,
   wherein the first separation device and/or the second separation device is/are connected to the third forced circulation evaporative crystallizer for conducting the separated aqueous liquid from the first separation device and/or the second separation device to the third forced circulation evaporative crystallizer;
   wherein the third forced circulation evaporative crystallizer is connected to the third separation device for conducting a slurry stream comprising an aqueous liquid and crystals from the third forced circulation evaporative crystallizer to the third separation device for separating the crystals from the aqueous liquid; and
   wherein the third separation device is connected to the third dilution vessel for conducting crystals from the third separation device to the third dilution vessel;
   wherein the first forced circulation evaporative crystallizer for conducting crystals from the third separation device to the third dilution vessel;
   wherein the third dilution vessel is connected to a source of aqueous liquid for re-dissolving crystals received from the third separation device; and
   wherein the third dilution vessel is connected to the first forced circulation evaporative crystallizer for conducting a brine comprising re-dissolved crystals from the third dilution vessel to the first forced circulation evaporative crystallizer.

3. A chemical process apparatus for producing purified brine comprising a chemical reaction apparatus suitable for reacting a chlorine-atom containing compound with sodium hydroxide to make an aqueous brine solution and a brine purification apparatus according to claim 1, wherein the chemical reaction apparatus is connected to the brine purification apparatus for conducting an aqueous brine solution from the chemical reaction apparatus to the brine purification apparatus and the chemical reaction apparatus is connected to a source of aqueous sodium hydroxide solution for conducting the aqueous sodium hydroxide solution to the chemical reaction apparatus.

4. The chemical process apparatus according to claim 3, wherein the chemical reaction apparatus is suitable for (i) converting chlorohydrin(s) to epichlorohydrin; (ii) making epoxy resin(s); or (iii) making methylene dianiline.

5. The chemical process apparatus according to claim 4, further comprising a hydrochlorination apparatus suitable for making chlorohydrin(s) and the hydrochlorination apparatus is connected to the chemical reactor apparatus for conducting a stream comprising chlorohydrin(s) from the apparatus for making chlorohydrin(s) to the chemical reactor apparatus.

6. The apparatus according to claim 1, wherein the first and second forced evaporative crystallizers preferably function as multiple effect evaporators connected in series.

7. The apparatus according to claim 1, wherein at least one connection for a liquid or slurry comprises at least one pump for applying pressure to the liquid or slurry in the specified conducting direction.

8. The apparatus according to claim 1, wherein at the operating pressure of the first crystallizer is less than the second crystallizer.

9. The apparatus according to claim 1, wherein each separation device is a centrifuge and/or a hydrocyclone.

10. The apparatus according to claim 9, wherein the separation device performs a continuous separation.

11. The apparatus of claim 1, wherein water evaporated during forced circulation evaporative crystallization is recovered via mechanical vapor recompression (MVR).

12. The apparatus according to claim 1, wherein the brine purification apparatus is connected to an electrochemical cell for conversion of the purified brine to chlorine gas or hypochlorite and sodium hydroxide via conventional chloroalkali process.

* * * * *